United States Patent [19]

Rose et al.

[11] 4,078,020
[45] Mar. 7, 1978

[54] THERMOPLASTIC ELASTOMERS COMPRISING ETHYLENE-α-OLEFIN COPOLYMER, POLYPROPYLENE AND POLYBUTENE

[75] Inventors: Rod A. Rose, Holt; Andre Fritz, Okemos, both of Mich.

[73] Assignee: Ciba-Geigy Corporation, Ardsley, N.Y.

[21] Appl. No.: 673,234

[22] Filed: Apr. 2, 1976

[51] Int. Cl.$^2$ .............................................. C08L 23/12
[52] U.S. Cl. .............................. 260/897 A; 260/42.18; 260/42.46; 260/42.47; 260/45.8 N; 260/45.95 R
[58] Field of Search ..................................... 260/897 A

[56] References Cited

U.S. PATENT DOCUMENTS

| | | | |
|---|---|---|---|
| 3,806,558 | 4/1974 | Fischer | 260/897 A |
| 3,835,201 | 9/1974 | Fischer | 260/897 A |
| 3,836,607 | 9/1974 | Finkmann et al. | 260/897 A |
| 3,849,520 | 11/1974 | Bullard et al. | 260/897 A |
| 3,946,897 | 3/1976 | Wolff | 260/897 A X |

FOREIGN PATENT DOCUMENTS 1,037,819  8/1966  United Kingdom ................ 260/897

*Primary Examiner*—Carman J. Seccuro
*Attorney, Agent, or Firm*—Nestor W. Shust

[57] ABSTRACT

Thermoplastic elastomeric compositions of this invention comprise (a) 25–80% of uncured ethylene-α-olefin copolymer, (b) 25–80% of crystalline isotactic polypropylene and 10–50% of crystalline isotactic polybutene-1. This composition is useful as a molding material exhibiting overall superior properties.

12 Claims, No Drawings

THERMOPLASTIC ELASTOMERS COMPRISING ETHYLENE-α-OLEFIN COPOLYMER, POLYPROPYLENE AND POLYBUTENE

BACKGROUND OF THE INVENTION

Thermoplastic elastomeric materials have been known in the art for a long time. These materials became commercially important because they possessed such important properties as crack resistance, resistance to solvents and aging, could be processed and fabricated and did not require vulcanization to develop elastomeric properties. Conventionally these materials have been made by block or graft copolymerization. Later various olefin blends have been prepared but because of different solubility parameters of the components, the blends suffered from phase separation in the melt or in the solid phase which often caused poor physical characteristics and poor appearance because of the presence of flow lines. To overcome some of the deficiencies methods have been developed to make stable blends of chemically dissimilar elastoms and plastics as disclosed in U.S. Pat. No. 3,658,752. Also to improve the elastomeric properties of such compositions a partially cured monoolefin copolymer rubber (such as EPM, ethylene-propylene copolymer rubber or EPDM, ethylene-propylene-non-conjugated diene rubber) has been blended with a polyolefin resin, such as polyethylene or polypropylene (U.S. Pat. No. 3,758,643). The thermoplastic elastomeric compositions of this invention which are blends of various olefinic polymers provide a composition having superior physical properties and superior esthetic appearance without partial curing or vulcanization.

DETAILED DISCLOSURE

This invention is directed to a thermoplastic composition which comprises a blend of olefin polymers and isotactic crystalline polybutene-1. More specifically, the thermoplastic composition comprises a. 20 to 80% by weight of an uncured ethylene-higher α-olefin copolymer which optionally may also contain a diene,
b. 20 to 60% by weight of crystalline isotactic polypropylene, and
c. 5 to 40% by weight of crystalline isotactic butene-1 homopolymer.

This composition can advantageously also contain 0 to 50% by weight of fillers.

The above described thermoplastic blend, when alloyed at a temperature above the softening temperature of the ethylene and propylene polymers and below the degradation temeperature of said polymers and of polybutene-1, are unexpectedly compatible as shown by exceptionally good physical properties and devoid of flow lines after processing via injection molding. Such thermoplastic compositions are useful in the manufacture of a variety of parts, such as the automotive trim applications. Furthermore, shaped articles for the electrical and telephone industries can be easily molded with the advantage of remaining flexible at very low temperatures and exhibiting some rubber-like characteristics unattainable by conventional thermoplastics. In other words, the compositions of this invention, as compared to prior art thermoplastic compositions, have a low brittle point, high bending strength, improved elasticity behavior, low temperature impact toughness, high abrasion and tear resistance, improved moldability, good stretching properties, resists plasticizer migration and exceptionally good uniform appearance.

The thermoplastic composition of this invention preferably comprises a. 30 to 50% by weight of an uncured ethylene-higher α-olefin copolymer which consists essentially of 60-85% ethylene and 15-40% of propylene, and preferably of 65-82% ethylene and 18-35% propylene, and having Mooney viscosity of 250° F from 40-80;
b. 25-50% by weight of crystalline isotactic polypropylene, having
c. 10-30% by weight of crystalline isotactic butene-1 homopolymer.

The ethylene-higher olefin copolymer of component (a) may additionally contain up to about 5% of a diene such as 1,4- hexadiene, norbornenes, alkylidene norbornenes, alkenyl norbornenes, dicyclopentadiene and the like. The higher α-olefin which is polymerized with ethylene to form component (a) can be any dissimilar α-olefin of 3 to 12 carbon atoms such as propylene, pentene-1, hexene-1, heptene-1, octene-1, dodecene, 4-methylpentene-1, 3-methylbutene-1, vinylcyclohexane and the like. Preferably the dissimilar higher α-olefin is propylene. The ethylene-olefin, especially propylene copolymers, and methods of their preparation are well known in the art as for example, in U.S. Pat. No. 2,824,090.

Component (b) is crystalline isotactic polypropylene which is also known in the art as shown in U.S. Pat. No. 3,112,300. Up to about 50% of the isotactic polypropylene may be replaced by a crystalline isotactic propylene-ethylene copolymer which consists essentially of 0.5 to 3.0% by weight of ethylene and 97 to 99.5% of propylene. Preferably component (b) is crystalline isotactic polypropylene.

Component (c) is crystalline isotactic butene-1 homopolymer which is commercially available and whose preparation is disclosed in U.S. Pat. Nos. 2,882,263, 3,362,940 and 3,112,300. Polybutene-1 can be replaced by a crystalline isotactic copolymer consisting essentially of at least 90% of butene-1 and up to 10% of an α-olefin having up to 12 carbon atoms, such as ethylene, propylene, pentene -1, and the other α-olefins listed above. Preferably component (c) is polybutene-1.

In the manufacture of finished articles it is customary to incorporate up to about 50%, and preferably up to about 35%, based on the weight of the polymer, of a filler as is well known in the art. Illustrative examples of useful fillers are carbon black, glass beads, calcium carbonate, amorphours silica, mica and other well known fillers. Additionally the composition normally also contains various stabilizers, such as thermal and UV stabilizers which can be phenolic compounds, benzophenones, benzotriazoles and others in amounts of from 0.1 to 1%. It is also advantageous to incorporate processing agents such as distearylthiodipropionate or dilaurylthiodipropionate in similar amounts to improve the flow characteristics during injection molding.

Normally the compositions of this invention are formulated by blending the material to flux in a Banburey or other mixing machinery above the melting pointing polypropylene, preferably between 300° F (about 150° C) and 500° F (260° C). Subsequently the blend is processed with conventional injection molding machines and extruders.

The following examples further illustrate the present invention without introducing any limitations thereto.

The compositions shown in Table I below are blended by charging the indicated ingredients into a Banbury blender preheated to 250° F (121° C). This mix masticated until the temperature reaches 300°-350° F (149°-177° C (Flux temperature). The mixing is continued for an additional 5-8 minutes, then discharged into an extruder. Extrusion of the composition is carried out at 450° F (232° C) into strands which are subsequently pelletized for further evaluation. In Table I the amounts of the components are expressed in parts by weight.

TABLE 1

| Thermoplastic Elastomeric Compositions | | | | | | | |
|---|---|---|---|---|---|---|---|
| Ingredients: | A* | B | C | D* | E | F | G | H |

| EPDM 71% Ethylene (1) | — | — | 60 | — | — | — | — | — |
| EPDM 81% Ethylene (2) | 60 | 60 | — | 60 | — | — | — | — |
| EPDM 71% Ethylene (3) | — | — | — | — | 40 | 60 | — | 20 |
| EPM 75% Ethylene (4) | — | — | — | — | — | — | 50 | — |
| Polypropylene, MF 13 | 40 | 30 | 30 | 40 | 40 | 30 | 40 | 60 |
| Polybutene-1 MF 20 | — | 10 | 10 | — | 20 | 10 | 10 | 10 |
| Carbon black (SRF-S) | 40 | 40 | 40 | — | — | — | — | — |
| HiSil 233 Amorphous Silica | — | — | — | — | — | — | — | 10 |

(1) EPDM contains 0.9% 1,4-Hexadiene and 28.1% propylene
(2) EPDM contais 0.8% 1,4-hexadiene and 18.2% propylene
(3) EPDM contains 1.7% Ethylidenenorbornene and 27.3% propylene
(4) EPM contains 25% propylene
*control compositions outside the scope of the invention The above described compositions were subjected to various standard tests to demonstrate the superior properties of the compositions of this invention. Also a visual examination of the samples was made to note the presence of any flow lines, i.e., rather outstanding lines visible on the surface of the injection molded article as shown in Table II below.

Sample A is outside the scope of the composition of this invention and was used as a control. It is identical to sample B except for the absence of polybutene-1 in A. Substantial differences in physical properties of the two samples of similar composition can be noted:

a. A Exhibits relatively lower tensile strength than B.
b. Elongation property of B is substantially better than that of A.
c. A significant drop in the Flex Modulus is achieved in spite of the incorporation of crystalline polybutene-1 in composition B.
d. Plaques prepared from composition A had visible flow lines while the surface of the plaques prepared from composition B was very uniform without any flow lines.

Composition D is another control sample which contains the same EPDM as A except that it does not have any carbon black. The flow lines are present in the injection molded plaques.

Compositions E, F and H differ from each other by having different proportions of the various components. These compositions exhibit various physical properties, but none of the molded plaques prepared from these compositions possess flow lines. Furthermore, even though these compositions contain lower amount of ethylene in the EPDM (which contributes most to the green strength of EPDM), their tensile strength is higher than that of composition D).

Composition G also exhibits improved tensile strength and does not show any flow lines on injection molded plaques. The absence of a diene does not have a detrimental effect on the composition. Composition H, similarly to compositions B and C, contains a filler. It also exhibits good physical properties and has no flow lines in the injection molded plaques.

TABLE 2

| PROPERTIES OF THERMOPLASTIC ELASTOMERIC COMPOSITIONS | | | | | | | | |
|---|---|---|---|---|---|---|---|---|
| Properties: | A* | B | C | D* | E | F | G | H |
| Durometer Shore D, ASTM 2240 | 50 | 50 | 38 | 50 | 50 | 40 | 50 | 58 |
| Specific Gravity, ASTM 792-A | 1.02 | 1.02 | 1.01 | 0.87 | 0.88 | 0.87 | 0.88 | 0.94 |
| Tensile Strength,psi. ASTM D-412 | 1,920 | 2,700 | 2,000 | 1,810 | 3,200 | 2,100 | 2,760 | 2,430 |
| Tensile Stress at 100% ASTM D-412 | 1,850 | 1,500 | 1,820 | 1,500 | 2,200 | 1,700 | 1,980 | 2,130 |
| Elongation Ultimate (%) ASTM D-412 | 330 | 570 | 270 | 610 | 450 | 390 | 460 | 420 |
| Flexural Modulus, psi. ASTM D-790 | 55,200 | 36,100 | 19,600 | 47,700 | 59,700 | 25,900 | 55,000 | 109,000 |
| Tear Strength, pli. ASTM D-624 | 640 | 660 | 510 | 650 | 760 | 530 | 758 | 704 |
| Appearance on Injection Molded Plaques | Flow-lines | No Flow. | No Flow. | Flow-lines | No Flow. | No Flow. | No Flow. | No Flow. |

*Control compositions - outside the scope of the invention.

Following are additional compositions which exhibit exceptionally good properties.

Composition I

70 EPM (75% ethylene and 25% propylene)
25 Polypropylene 5 Polybutene-1

Composition J

60 EPM (71% ethylene and 29% propylene)
30 Polypropylene
10 Polybutene-1

What is claimed is:

1. A thermoplastic elastomer composition comprising
   a. 20 to 80% by weight of an uncured ethylene-higher α-olefin copolymer, which consists essentially of 60-85% of ethylene and 15-40% of a higher α-olefin,
   b. 20 to 60% by weight of crystalline isotactic polypropylene, and
   c. 5 to 40% by weight of crystalline isotactic butene-1 homopolymer.

2. A composition of claim 1 which essentially comprises
   a. 30 to 50% by weight of an uncured ethylene-higher α-olefin copolymer which consists essentially of 60-85% of ethylene and 15-40% of propylene;
   b. 20-50% by weight of crystalline isotactic polypropylene; and
   c. 10-30% by weight of crystalline isotactic butene-1 homopolymer.

3. A composition of claim 2 wherein the ethylene-higher α-olefin copolymer consists essentially of 65-82% of ethylene and 18-35% of propylene.

4. A composition of claim 1 which consists essentially of
   a. 30 to 50% by weight of an uncured ethylene-higher α-olefin copolymer which consists essentially of 60–85% of ethylene, 15–40% of propylene and 1–5% of a diene;
b. 30–50% by weight of crystalline isotactic polypropylene; and
c. 10–30% by weight of crystalline isotactic polybutene-1.

5. A composition of claim 4 wherein in the ethylene-higher α-olefin copolymer the diene is 1,4-hexadiene, ethylidenenorbornene or dicyclopentadiene.

6. A composition of claim 1 containing additionally an antioxidant, a UV stabilizer and a filler.

7. A composition of claim 1 consisting essentially of
a. 40% of ethylene-propylene-diene copolymer,
b. 40% of polypropylene, and
c. 20% of polybutene-1.

8. A composition of claim 1 consisting essentially of
a. 60% of ethylene-propylene-diene copolymer,
b. 30% of polypropylene, and
c. 10% of polybutene-1.

9. A composition of claim 1 consisting essentially of
a. 34% of ethylene-propylene-diene copolymer
b. 55% of polypropylene, and
c. 11% of polybutene-1.

10. A composition of claim 1 consisting essentially of
a. 60% of ethylene-propyelen-diene copolymer,
b. 30% of polypropylene and
c. 10% of polybutene-1.

11. A composition of claim 1 consisting essentially of
a. 40% of ethylene-propylene copolymer,
b. 40% of polypropylene, and
c. 20% of polybutene-1.

12. A composition of claim 1 consisting essentially of
a. 40% of ethylene-propylene copolymer,
b. 45% of polypropylene, and
c. 15% of polybutene-1.

* * * * *